United States Patent Office 3,558,261
Patented Jan. 26, 1971

3,558,261
5-ARYLAZO-PYRIMIDINE POLYESTER DYES
Hans Ackermann, 41 Essigstrasse; Werner Bossard, 65 Wenkenstrasse; Jacques Voltz, 3 Schutzenrain; and Hans Wegmuller, 18 Kornfeldstrasse, all of Riehen, Switzerland
No Drawing. Filed July 22, 1966, Ser. No. 567,057
Int. Cl. C09b 27/00; D06p 1/02, 3/34
U.S. Cl. 8—41                                   6 Claims

ABSTRACT OF THE DISCLOSURE

The present invention concerns processes for the dyeing of hydrophobic organic fibers consisting of linear macromolecular esters of aromatic polycarboxylic acids with polyvalent alcohols, or of cellulose ester, with new, water-dispersible but only slightly water-soluble azo dyestuffs free from ionogenic groups which dissociate in water having the formula:

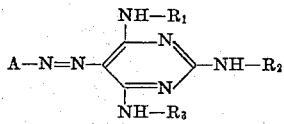

wherein
A represents carbocyclic or heterocyclic aryl, one of $R_1$, $R_2$ and $R_3$ represents unsubstituted or non-ionogenically substituted phenyl and each of the other R substituents represents hydrogen or alkyl, cycloalkyl or phenalkyl, each of the latter three substituents being unsubstituted or non-ionogenically substituted.

The present invention also comprises, as an industrial product, dyed hydrophobic organic fibers produced according to the dyeing process of the present invention.

---

The present invention concerns new, slightly to very slightly soluble azo dyestuffs which are water-dispersible, processes for the dyeing of hydrophobic organic fibers, especially textile fibers consisting of linear, high molecular esters of aromatic polycarboxylic acids with polyvalent alcohols or of cellulose esters, and as industrial product, dyed hydrophobic organic fibers attained with the new dyestuffs.

It has been found that valuable, water-dispersible, difficultly soluble azo dyestuffs are obtained by coupling the diazonium compound of an amine of Formula I $$A\text{—}NH_2 \quad (I)$$

with a coupling component of Formula II

to form an azo dyestuff of Formula III

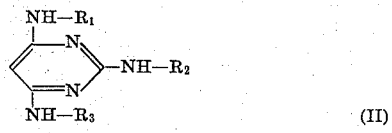

the components being so chosen that they contain no ionogenic, salt-forming groups.

In these formulae:

A represents a carbocyclic or heterocyclic aryl radical which can contain non-ionogenic substituents, including a phenyl azo group, of $R_1$, $R_2$ and $R_3$ one R represents an unsubstituted or non-ionogenically substituted phenyl radical and each other R represents hydrogen or an unsubstituted or non-ionogenically substituted alkyl, cycloalkyl or phenalkyl group.

By ionogenic, salt forming groups which are excluded as substituents in the starting components of Formulae I and II and new dyestuffs of Formula III, are meant here and below the known, water solubilising substituents which dissociate acid in water and lend anionic character to the dyestuffs such as sulphonic acid, carboxylic acid, phosphonic acid groups, and onium groups which latter give a cationic character to the dyestuffs, e.g. the ammonium and sulphonium groups; thus rings and substituents defined as non-ionogenically substituted do not contain such groups.

When A represent a homocyclic aryl radical, this is mono- or poly- nuclear, condensed or uncondensed, particularly it is an unsubstituted or non-ionogenically substituted phenly or naphthyl radical. Preferably A represents a phenyl radical which contains at least one non-ionogenic electron-attracting substituent in o- and/or p-position to the amino group and to the azo bond, respectively. As electron-attracting, non-ionogenic substituents it can contain, e.g. the cyano, nitro, thiocyano or trifluoromethyl group; halogens such as fluorine, bromine or chlorine; acyl groups, especially carbacyl groups such as low alkanoyl or low alkenoyl groups, aroyl groups such as benzoyl groups or organosulphonyl groups such as low alkylsulphonyl or arylsulphonyl groups, further sulphonic acid aryl ester groups such as sulphonic acid phenyl, alkylphenyl or halogenphenyl ester groups; carboxylic acid ester groups, e.g. the carbophenoxy group, particularly however optionally non-ionogenically substituted carbalkoxy groups such as the carbomethoxy, carboethoxy, carboisopropoxy, carbobutoxy, methoxy-carboethoxy or chloro-carboethoxy group; sulphonic acid amide or carboxylic acid amide groups; N-mono- or N-di- substituted carbamoyl or sulphamoyl groups having a phenyl group and/or having alkyl, hydroxyalkyl, alkanoyloxyalkyl, alkoxyalkyl or benzyl substituents. It is possible for all these groups to be further substituted non-ionogenically. In addition to the aforesaid preferred, electron-attracting substituents the radical A can also contain non-ionogenic, electron-releasing substituents, e.g. low alkyl groups or low alkyl groups mono-substituted, e.g. by a cyano, hydroxy, low alkoxy group or by a halogen such as chlorine or bromine, optionally non-ionogenically substituted low alkoxy groups such as methoxy, ethoxy or ethoxy-carbonylmethoxy groups, phenoxy groups, alkyl- or halogen-substituted phenoxy groups, or acylamino groups, particularly carbacylamino groups, e.g. low alkanoylamino groups such as the acetylamino group, aroylamino groups such as the benzoylamino group, or low alkylsulphonylamino groups such as the methylsulphonylamino group, or arylsulphonylamino groups such as the phenylsulphonylamino group.

When A contains a phenyl azo group, then in an aromatic carbocycle, the azo group preferably takes the p-position. The phenyl azo group is preferably unsubstituted; however, it can also be substituted by halogens such as fluorine, chlorine or bromine, low alkyl, low alkoxy groups, or by the nitro group. When A is a phenylazo-phenyl radical then also the phenylene radical thereof can contain further substituents, e.g. low alkyl or low alkoxy groups, halogens such as fluorine, chlorine or bromine; preferably however, the phenylazophenyl-radical is unsubstituted.

If A is a naphthyl radical it can be an unsubstituted or a non-ionogenically substituted 1- or 2-naphthyl radical. Here, the principal substituents are low alkyl or low alkoxy groups, halogens such as chlorine or bromine, optionally N-substituted sulphonic acid amide groups, sulphonic acid aryl ester groups, low alkylsulphonyl groups or arylsulphonyl groups.

When A represents the radical of an aromatic heterocycle then it is principally the radical of a 5- or 6-membered heterocycle, preferably containing nitrogen, which belong, e.g. to the pyrazole, thiazole, oxydiazole, thiodiazole, triazole or pyridine series. It can also represent the radical of a polynuclear condensed heterocycle; this then preferably has a fused benzene ring, such as an optionally non-ionogenically substituted benzthiazole, indazole or quinoline ring. Also the fused benzene ring can be substituted by non-ionogenic substituents, especially by halogens, nitro, cyano, thiocyano, low alkyl, low alkoxy, low alkyl-sulphonyl, N-alkyl- or N,N-dialkyl-sulphamide groups.

In preferred dyestuffs of Formula III, A represents:

(a) A phenyl radical substituted by at least one non-ionogenic electron-attracting substituent in o- and/or p-position to the azo bond, or (b) A benzthiazolyl-(2) radical optionally substituted by chlorine, a nitro, rhodan, low alkyl, low alkoxy, low alkylsulphonyl or a N-low-alkyl or N,N-di-low-alkylsulphamide group, or (c) A 4-phenylazophenyl radical optionally substituted by a low alkyl group.

If each of $R_1$, $R_2$ and $R_3$ represents an alkyl radical, then this radical can contain 1 to 8 carbon atoms in a straight or branched chain. Preferably it has 1 to 5 carbon atoms. If this alkyl radical is substituted, then examples of substituents are the hydroxyl group or a low alkoxy group such as the methoxy group, the cyano group or halogens such as chlorine or bromine. As cycloalkyl or phenalkyl groups, $R_1$, $R_2$ and $R_3$ represent, e.g. the cyclohexyl or the benzyl group.

When $R_1$, $R_2$ or $R_3$ represents a phenyl radical, this can be non-ionogenically substituted, e.g. by the non-ionogenic substituents as hereinabove mentioned, especially by halogens such as fluorine, chlorine or bromine, cyano groups, low alkyl or low alkoxy groups, by the hydroxyl group, low alkyl sulphonyl groups, low alkylsulphonyloxy groups, low alkanoyl or low carbalkoxy groups, low alkanoylamino or low alkylsulphonylamino groups, unsubstituted sulphamyl or carbamyl groups, sulphamyl or carbamyl groups N-mono- or N,N-di-substituted by low alkyl, low hydroxyalkyl, low alkoxy-low alkyl or low cyanoalkyl groups.

In dyestuffs which are distinguished, among other things, by easy accessibility and high affinity to polyglycol terephthalate fibres and also by extraordinary stability in a boiling dyebath and which, in addition, are fast to sublimation, the coupling components correspond to Formula IIa,

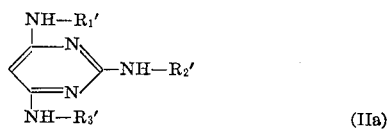

(IIa)

wherein of $R_1'$, $R_2'$ and $R_3'$ one $R'$ represents an unsubstituted or non-ionogenically substituted phenyl radical, and the others are hydrogen or identical alkyl groups.

When one of the radicals $R_1'$, $R_2'$ and $R_3'$ is a non-ionogenically substituted phenyl radical, the preferred substituents are, e.g. halogens such as chlorine or bromine, low alkyl or alkoxy groups.

Azo dyestuffs according to the invention which are of the formula

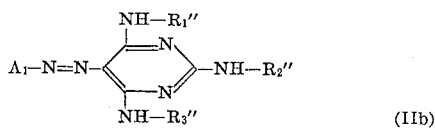

(IIb)

wherein $A_1$ represents a phenyl radical substituted by from 1 to 3 electron-attracting substituents in positions ortho and para relative to the azo bridge, one of $R_1''$ and $R_2''$ represents phenyl substituted by one of the following: hydrogen, lower alkyl, lower alkoxy, and the other of the last-mentioned (R'''s) as well as $R_3''$ represent hydrogen and lower alkyl, are of particularly high affinity for polyethylene glycol terephthalate fibers, and the dyeings obtained therewith on the latter fibers are of especially satisfactory fastness to light.

Very good light fastness is obtained with such dyestuffs of Formula II(b) in which $A_1$ is of the formula 2-cyano-4-nitro-phenyl,
2,4-dinitrophenyl,
2,4-dinitro-6-chloro-phenyl,
2,4-dinitro-6-bromo-phenyl,
2,6-dichloro-4-nitro-phenyl,
2-nitro-4-methylsulfonyl-phenyl, and
2-nitro-4-ethylsulfonyl-phenyl, and similar groupings which fall under the formula

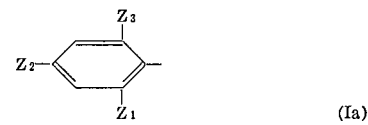

(Ia)

wherein $Z_1$ represents nitro, cyano, chloro or bromo
$Z_2$ represents nitro, chloro, bromo or alkyl-sulfonyl, and
$Z_3$ represents hydrogen, chloro or bromo.

The term "low" as used in this specification and in the appended claims in connection with "alkyl" and "alkoxy" means that these radicals have from 1 to 5 carbon atoms, in connection with "alkanoyl" it means radicals of from 2 to 5 carbon atoms.

The coupling components of Formula II usable according to the invention are produced, e.g. by reacting a phenylamino-dichloropyrimidine of Formula IV

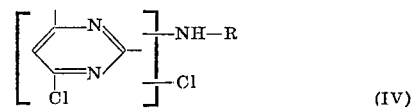

(IV)

wherein R represents an unsubstituted or non-ionogenically substituted phenyl radical, with ammonia or with an optionally non-ionogenically substituted primary alkyl, cycloalkyl or phenalkyl amine, at a raised temperature. Preferably this reaction is performed at temperatures of 80–160° C. in a closed vessel. Phenylamino-dichloro-pyrimidines of Formula IV are obtained by known methods, e.g. by reacting 2,4,6-trichloropyrimidine with optionally non-ionogenically substituted phenylamines of the Formula R—NH₂.

The products resulting from the condensation are generally mixtures of isomers of 2-phenylamino-4,6-dichloropyrimidines and 4-phenylamino-2,6-dichloro-pyrimidines, which are then separated by fractionated crystallization or chromatographic techniques.

The coupling of the diazonium compounds of an amine of Formula I with a coupling component of Formula II is performed by the usual methods, preferably in mineral acid to weakly acid aqueous medium, more especially at a pH of 4–4.5. When coupling in a mineral acid medium, the acid is advantageously gradually buffered, for example, with alkali metal salts of lower fatty acids. It is also possible to simultaneously couple a suitable diazonium compound with a mixture of isomeric coupling components usable according to the invention.

The dyestuffs according to the invention are finely dispersed by milling with surface active dispersing agents.

Suitable dispersing agents are, e.g. anionic such as alkali metal salts of sec. higher alkylaryl sulfonates, alkali metal salts of condensation products of formaldehyde and naphthalene-sulfonic acids, lignin sulfonates, or non-ionogenic dispersing agents such as fatty alcohol polyglycol ethers.

When so prepared, the dyestuffs according to the invention are suitable principally for the dyeing of hydrophobic organic synthetic textile fibers from an aqueous dispersion, especially for the dyeing of textile fibers consisting of linear high molecular esters of aromatic polycarboxylic acids with polyfunctional alcohols, e.g. polyglycol terephthalate, polyglycol isophthalate or polycyclohexane diol terephthalate fibers or consisting of cellulose acetates, e.g. cellulose-2½ acetate or cellulose triacetate fibers.

The dyestuffs according to the invention can also be used for the dyeing of synthetic polyamide fibers such as nylon.

The dyeing of polyglycol terephthalate fibers with aqueous dispersions of the dyestuffs according to the invention is preferably performed at temperatures of over 100° C. under pressure above atmospheric. The dyeing can also be performed, however, at the boiling point of the dye liquor in the presence of carriers such as phenyl phenols, polychlorobenzene compounds or similar auxiliaries, or by a pad dyeing process followed by thermofixation at 180–220° C.

Dyestuffs according to the invention have good affinity for hydrophobic organic fibers, polyester fibers such as polyglycol terephthalate or cellulose acetate type fibers, preferably the former and, depending on their composition, produce on these fibers strongly colored greenish-yellow, yellow, orange, red or claret dyeings which have excellent fastness to washing, milling, sublimation, light, crocking, perspiration, solvents, cross dyeing, decatising, gas fading and industrial fumes. Moreover, the dyestuffs according to the invention reserve animal and vegetable fibers well, particularly cotton and wool. Even on closely woven fabric or tightly twisted yarn, good and evenly penetrated dyeings are obtained with the dyestuffs according to the invention.

The dyestuffs according to the invention, especially their isomeric mixtures, differ from previously known dyestuffs of similar constitution by their very good drawing powers and build-up onto polyglycol terephthalate fibers. In addition, dyeings attained with the dyestuffs according to the invention have considerably better fastness to light and or sublimation.

Particularly valuable dyestuffs according to the invention having good fastness to sublimation and excellent fastness to light as well as very good drawing power and build-up are derived from the isomeric mixtures of the Formulae Va and Vb

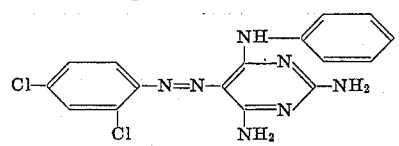

wherein $Z_1$ represents the nitro or cyano group, chlorine or bromine, $Z_2$ represents the nitro, methyl or ethylsulphonyl group, chlorine or bromine, $Z_3$ represents hydrogen, chlorine or bromine, $R_1''$ represents hydrogen or the methyl group and $R_2''$ and $R_3''$ are identical low alkyl radicals.

Thus, 2,4-diamino-5-arylazo-6-hydroxy- and 6-aminopyrimidines are known as dyes for acrylic fibers. However, these dyes either do not draw at all on polyester fibers especially of the polyterephthalate type, or, if they draw on these fibers, the resulting dyeings fail in important fastness properties that are required of such dyeings by the trade.

The dyestuffs according to the invention are also suitable for the dyeing of cellulose acetates, polyglycol terephthalates and polyamides in the mass. Because of their good solubility in organic solvents such as acetone or chloroform, they can also be used in lacquers and printing inks.

The following examples illustrate the invention. The temperatures are given therein in degrees centigrade. "Polyglycol terephthalate" means the products known by the commercial names Terylene, Vycron, Dacron and Trevira.

EXAMPLE 1

16.2 g. of 1-amino-2,4-dichlorobenzene are finely dispersed in 300 g. of water and 30 g. of 36% hydrochloric acid and the dispersion is diazotised at 0.5° by the addition of a solution of 6.9 g. of sodium nitrite in 50 g. of water. A solution of 20.1 g. of 2,6-bis-amino-4-phenylamino-pyrimidine in 500 g. of 40% acetic acid is added dropwise to the clear diazonium solution obtained. The pH of the reaction mixture is then buffered with sodium acetate to 4–4.5. The yellow coupling product, the composition of which corresponds to the formula

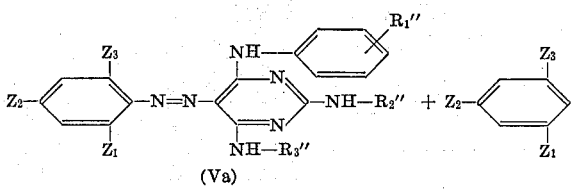

is filtered off, washed neutral with dilute sodium carbonate solution and finally washed free of salt with water. The dyestuff is dried in vacuo at 60–70° and then milled with a mixture of lignin sulphonate and the sodium salt of a condensation product of naphthalene-2-sulphonic-acid and formaldehyde. Pure yellow dyeings on polyethylene glycol terephthalate or cellulose triacetate fibres are attained with this dye preparation in aqueous dispersion, optionally in the presence of a carrier such as the sodium salt of o-phenylphenol. The dyeings have very good fastness to washing, rubbing, light and sublimation.

The 2,6-bis-amino-4-phenylamino-pyrimidine used in this example as coupling component is produced, e.g. by reacting 2,6-dichloro-4-phenylamino-pyrimidine with aqueous ammonia at 140–150°. The pure compound, obtained by crystallisation of the crude product from aqueous ethyl alcohol, melts at 162–163°.

EXAMPLE 2

A fine suspension of 16.5 g. of 1-aminobenzene-4-carboxylic acid ethyl ester in 400 g. of water, 30 g. of 36% hydrochloric acid and 5 g. of cetyl polyglycol ether is diazotised in the usual way by the addition of 6.9 g. of sodium nitrite at 0–5°. The diazonium salt solution is clarified and added dropwise, at 5–10°, to a solution of 20.1 g. of 2,6-bis-amino-4-phenylamino-pyrimidine in 500 g. of 40% acetic acid. The pH of the mixture is then raised to 4–4.5 by the addition of sodium acetate. On completion of the coupling, the precipitated yellow precipitate, the composition of which corresponds to the formula

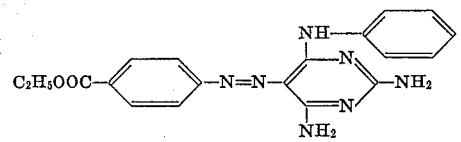

is filtered off, washed with a large amount of water and dried in vacuo at 60–70°. After milling with the sodium salt of a condensation product of naphthalene-2-sulphonic acid and formaldehyde, the dyestuff obtained dyes polyglycol terephthalate fibres from an aqueous dispersion, optionally in the presence of a carrier such as the sodium salt of o-phenylphenol, in pure yellow shades. The dye bath is substantially exhausted. The dyeings have very good fastness to washing, rubbing, light and sublimation. Also closely woven fabric or tightly twisted yarns are well and evenly penetrated.

Dyestuffs having similar properties are obtained if the diazo components given in column 2 of the following Table I are coupled under the conditions described in the above Example 2 with the equimolar amount of one of the coupling components given in column 3.

precipitate formed, the composition of which corresponds to the formula

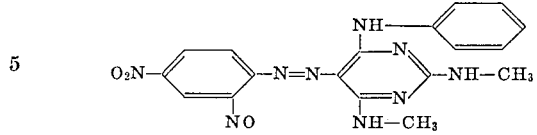

is filtered off, washed with a large amount of water and then dried in vacuo as usual at 60–70°. 5 g. of the dyestuff so obtained are brought into a finely dispersible form by milling with 15 g. of a lignin sulphonate.

Polyglycol terephthalate fibres dyed in clear red shades are obtained with this dye preparation in aqueous dispersion, optionally in the presence of a carrier such as the sodium salt of o-phenylphenol. The dyeings have very good fastness to washing, rubbing, light and sublimation.

TABLE I

| Example No.: | Diazo component | Coupling component | Shade on polyglycolterephthalate fibres |
|---|---|---|---|
| 3 | 1-amino-2-chlorobenzene | 2,6-bis-amino-4-phenylamino-pyrimidine. | Greenish-yellow. |
| 4 | 1-amino-4-chlorobenzene | do | Do. |
| 5 | 1-amino-2,4-di-bromobenzene | do | Yellow. |
| 6 | 1-amino-4-fluorobenzene | do | Do. |
| 7 | 1-amino-2-cyanobenzene | do | Do. |
| 8 | 1-amino-3-trifluoromethylbenzene | do | Greenish-yellow. |
| 9 | 1-amino-2-nitrobenzene | do | Orange. |
| 10 | 1-amino-2-nitro-4-methylbenzene | do | Do. |
| 11 | 1-amino-2-nitro-4-methoxybenzene | do | Scarlet. |
| 12 | 1-amino-2-nitro-4-chlorobenzene | do | Orange. |
| 13 | 1-amino-2,4-dinitrobenzene | do | Do. |
| 14 | 1-amino-2-cyano-4-nitrobenzene | do | Do. |
| 15 | 1-amino-2-bromo-4-nitrobenzene | do | Do. |
| 16 | 1-amino-2,4-dinitro-6-chlorobenzene | do | Do. |
| 17 | 1-amino-4-acetylbenzene | do | Greenish-yellow. |
| 18 | do | 2,6-bis-amino-4-(2'-methyl-phenyl-amino)-pyrimidine. | Do. |
| 19 | 1-amino-4-benzoylbenzene | do | Do. |
| 20 | do | 2,6-bis-amino-4-phenylamino-pyrimidine. | Do. |
| 21 | 1-aminobenzene-2-carboxylic acid ethyl ester | do | Yellow. |
| 22 | 1-aminobenzene-4-carboxylic acid butyl ester | do | Do. |
| 23 | 1-aminobenzene-4-carboxylic acid-β-methoxyethyl ester | do | Do. |
| 24 | do | 2,6-bis-amino-4-(4'-chlorophenyl-amino)-pyrimidine. | Do. |
| 25 | 1-aminobenzene-2-carboxylic acid-N-methyl-amide | do | Do. |
| 26 | 1-aminobenzene-4-carboxylic acid-N-methyl-N-β-hydroxy-ethylamide | do | Do. |
| 27 | 1-aminobenzene-3-sulphonic acid-N-ethylamide | 2,6-bis-amino-4-phenylaminopyrimidine. | Do. |
| 28 | 1-aminobenzene-4-sulphonic acid phenyl ester | do | Do. |
| 29 | 1-amino-4-methyl-sulphonylbenzene | do | Do. |
| 30 | do | 2,6-bis-amino-4-(2'-methoxyphenyl-amino)-pyrimidine. | Do. |
| 31 | 1-amino-2-nitro-4-methylsulphonylbenzene | do | Orange. |
| 32 | 1-amino-4-ethoxy-carbonylmethoxybenzene | 2,6-bis-amino-4-(2'-bromophenyl-amino)-pyrimidine. | Yellow. |
| 33 | 1-aminonaphthalene | 2,6-bis-amino-4-phenylaminopyrimidine. | Reddish-yellow. |
| 34 | 2-aminonaphthalene | do | Do. |
| 35 | 1-amino-4-phenylsulphonylbenzene | do | Yellow. |
| 36 | 1-amino-4-acetylaminobenzene | 2,6-bis-amino-4-phenylaminopyrimidine. | Do. |
| 37 | 1-amino-4-β-acetyloxy-ethylaminu-sulphonyl-benzene. | do | Do. |

EXAMPLE 38

18.3 g. of 1-amino-2,4-dinitrobenzene are dissolved in 100 g. of concentrated sulphuric acid and the solution is diazotised at 20–25° with the amount of nitrosyl sulphuric acid corresponding to 6.9 g. of sodium nitrite. The diazonium salt solution obtained is added dropwise at 0–5° to a solution of 22.9 g. of 2,6-bis-methylamino-4-phenyl-amino-pyrimidine in 250 g. of 80% acetic acid and 200 g. of water. On completion of the coupling, the red-brown The 2,6-bis-methylamino-4-phenylamino - pyrimidine used in the above Example 38 as coupling components is obtained, e.g. by reacting 2,6-dichloro-4-phenylamino-pyrimidine with aqueous methylamine at 140–150°.

Dyestuffs having similar good properties are obtained if a diazo component given in column 2 of the following Table II is coupled with one of the coupling components given in column 3 under the conditions described in the Example 38.

TABLE II

| Example No.: | Diazo component | Coupling component | Shade on polyglycol terephthalate fibres |
|---|---|---|---|
| 39 | 1-amino-2-chlorobenzene | 2,6-bis-n-propylamino-4-phenylamino-pyrimidine | Yellow. |
| 40 | do | 2,6-bis-(β-hydroxy-ethylamino)-4-phenylamino-pyrimidine. | Do. |
| 41 | 1-amino-2,4-dichlorobenzene | 2,6-bis-n-butylamino-4-phenylamino-pryimidine | Reddish yellow. |
| 42 | do | 2,6-bis-(γ-methoxypropylamino)-4-phenylamino pyrimidine. | Do. |
| 43 | 1-amino-2,5-dichlorobenzene | 2,6-bis-isopropylamino-4-phenylamino-pyrimidine. | Do. |
| 44 | 1-amino-4-acetylbenzene | 2,6-bis-ethylamino-4-(3'-methylphenylamino)-pyrimidine. | Do. |
| 45 | 1-aminobenzene-4-carboxylic acid methyl ester. | do | Do. |
| 46 | 1-aminobenzene-4-carboxylic acid-β-chloroethyl ester. | 2,6-bis-ethylamino-4-phenylamino-pyrimidine | Do. |
| 47 | 1-amino-4-nitrobenzene | 2,6-bis-cyclohexylamino-4-phenylamino-pyrimidine. | Yellowish-scarlet. |
| 48 | 1-amino-2-nitro-4-methylsulphonyl-benzene. | 2,6-bis-(β-chloroethylamino)-4-phenylamino-pyrimidine. | Scarlet. |
| 49 | 1-amino-2-nitrobenzene | 2-amino-4-phenylamino-6-γ-methoxypropylamino-pyrimidine. | Orange. |
| 50 | 1-amino-2-chloro-4-nitrobenzene | 2,6-bis-benzylamino-4-phenylamino-pyrimidine | Yellowish-scarlet. |
| 51 | 1-amino-2-cyano-4-nitrobenzene | 2,6-bis-ethylamino-4-phenylamino-pyrimidine | Scarlet. |
| 52 | 1-amino-2,4-dinitrobenzene | do | Red. |
| 53 | 1-amino-2,4-dinitro-6-chlorobenzene | do | Do. |
| 54 | 1-amino-4-nitro-2-methoxybenzene | 2,6-bis-propylamino-4-(3'-hydroxyphenylamino)-pyrimidine. | Do. |
| 55 | 1-amino-2-nitro-4-ethoxybenzene | 2-benzylamiuo-4-phenylamino-6-aminopyrimidine. | Brown-red. |
| 56 | 1-amino-2-nitro-4-phenoxybenzene | 2,6-bis-(γ-methoxy-propylamino)-4-(4'-bromo-phenylamino)-pyrimidine. | Do. |
| 57 | 1-amino-2-nitro-4-ethylsulphonyl-benzene. | 2,6-bis-ethylamino-4-phenylamino-pyrimidine | Yellowish-scarlet. |
| 58 | do | 2,6-bis-propylamino-4-phenylamino-pyrimidine | Do. |

EXAMPLE 59

A fine suspension of 19.7 g. of 4-amino-azobenzene in 500 g. of water, 75 g. of 36% hydrochloric acid and 5 g. of oleyl polyglycol ether is diazotised in the usual way at 15–20° by the addition of 6.9 g. of sodium nitrite. The clarified diazonium salt solution is added dropwise at 0–5° to a solution of 27.1 g. of 2,6-bis-ethylamino-4-(4'-methyl-phenylamino)-pyrimidine in 200 g. of water and 350 g. of 80% acetic acid. The pH of the coupling mixture is then adjusted to 4.5–5 by the addition of sodium acetate. To complete the coupling, the reaction mixture is stirred for 10 hours at 5–10°. The red precipitate formed, the composition of which corresponds to the formula

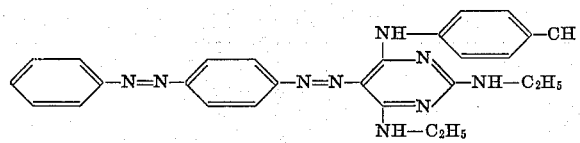

is filtered off, washed with water and dried in the usual way. 5 g. of the dyestuff obtained in this way are brought into a finely dispersed form by milling with 12 g. of sodium salt of a condensation product of naphthalene-2-sulphonic acid and formaldehyde. With this dye preparation in aqueous dispersion, optionally in the presence of a carrier such as sodium-o-phenylphenolate, polyglycol terephthalate fibres dyed in pure scarlet shades are obtained. The dyeings have very good fastness to perspiration, rubbing and sublimation.

The 2,6 - bis - ethylamino - 4-(4'-methyl-phenylamino)-pyrimidine used in this example as coupling component is obtained by the known method, e.g. by reacting 2,6-dichloro-4-(4'-methylphenylamino)-pyrimidine with aqueous ethylamine at 140–150°.

Dyestuffs having similar properties are obtained if a diazo component given in column 2 of the following Table III is coupled under the conditions described in the Example 59 with one of the coupling components given in column 3.

TABLE III

| Example No.: | Diazo component | Coupling component | Shade on polyglycol terephthalate fibres |
|---|---|---|---|
| 60 | 4-amino-azobenzene | 2,6-bis-methylamino-4-phenylamino-pyrimidine. | Scarlet. |
| 61 | 4-amino-2',3-dimethyl-azobenzene | do | Do. |
| 62 | do | 2,6-bis-amino-4-phenylamino-pyrimidine. | Orange. |
| 63 | 4-amino-4'-chloro-2-methyl-azobenzene. | do | Do. |
| 64 | 4-amino-azobenzene | 2,6-bis-ethylamino-4-phenylamino-pyrimidine. | Scarlet. |
| 65 | do | 2,6-bis-(γ-methoxy-propylamino)-4-phenylamino-pyrimidine. | Do. |

EXAMPLE 66

18 g. of 2-amino-6-methoxy-benzthiozole in 100 g. of concentrated sulphuric acid are diazotised for 3 hours at −5° with nitrosyl sulphuric acid, corresponding to 6.9 g. of sodium nitrite. The diazonium salt solution so obtained is added dropwise at 0–5° to a solution of 23.5 g. of 2,6-bis-amino-4-(3'-chlorophenylamino)-pyrimidine in 600 g. of water and 400 g. of 80% acetic acid. The free mineral acid is then buffered by the addition of sodium acetate. On completion of the coupling, the scarlet precipitate formed is filtered off, washed neutral with dilute sodium carbonate solution and then washed free of salt with water. The dried dyestuff, the composition of which corresponds to the formula

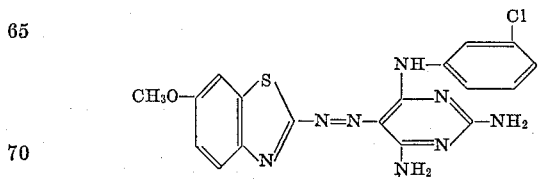

is an orange coloured powder. A preparation produced by milling it with a lignin sulphonate—when in aqueous dispersion optionally in the presence of a carrier such as the sodium salt of o-phenyl-phenol, dyes polyglycol terephthalate fibres in pure orange shades. The dyeings have very good fastness to washing, perspiration, rubbing and sublimation.

The 2,6 - bis - amino-4-(3'-chlorophenylamino)-pyrimidine used in the above example as starting material is obtained, e.g. by reacting 2,6-dichloro-4-(3'-chlorophenylamino)-pyrimidine with aqueous ammonia at 140–150°.

If, in the above example, the 18 g. of 2-amino-6-methoxybenzthiazole are replaced by a corresponding amount of one of the diazo components given in column 2 of the following Table IV and this is coupled under the conditions described with one of the coupling components given in column 3, then dyestuffs are obtained the dyeings of which have similar good properties on polyglycol terephthalate fibres.

acid and 200 g. of water. The pH of the coupling mixture is then adjusted to 4–5 by the addition of sodium acetate. The dark red coupling product, the composition of which corresponds to the formula

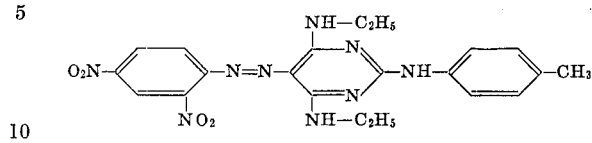

is filtered off, washed with water and dried at 70–80° in vacuo. 10 g. of the dyestuff so obtained are finely dispersed by milling with 30 g. of a lignin sulphonate. Polyglycol terephthalate fibres can be dyed in pure red shades with this dye preparation from an aqueous dispersion.

TABLE IV

| Example No.: | Dazo component | Coupling component | Shade on polyglycol terephthalate fibres |
|---|---|---|---|
| 67 | 2-amino-5-nitro-thiazole | 2,6-bis-amino-4-phenylamino-pyrimidine | Scarlet. |
| 68 | do | 2,6-bis-ethylamino-4-phenylamino-pyrimidine | Red. |
| 69 | 2-aminobenzthiazole | 2,6-bis-amino-4-phenylamino-pyrimidine | Yellowish orange. |
| 70 | -amino-6-methoxy-benzthiazole | do | Orange. |
| 71 | do | 2,6-bis-methylamino-4-phenylamino-pyrimidine | Scarlet. |
| 72 | 2-amino-6-rhodanbenzthiazole | do | Red. |
| 73 | 2-amino-6-rhodano-benzthiazole | 2,6-bis-amino-4-(4'-methylphenylamino)-pyrimidine | Scarlet. |
| 74 | 2-amino-6-cyano-benzthiazole | 2,6-bis-amino-4-phenylamino-pyrimidine | Do. |
| 75 | 2-amino-6-methyl-sulphonyl-benzthiazole | do | Orange. |
| 76 | do | 2,6-bis-(γ-methoxy-propylamino)-4-phenylamino-pyrimidine | Scarlet. |
| 77 | 2-amino-benzthiazole-6-sulphonic acid-N,N-diethylamide | do | Do. |
| 78 | 2-amino-6-chloro-benzthiazole | do | Do. |
| 79 | 2-amino-6-methoxy-benzthiazole | 2,6-bis-methylamino-4-(4'-cyano-phenylamino)-pyrimidine | Do. |
| 80 | 2-amino-6-ethoxy-benzthiazole | do | Do. |
| 81 | 2-amino-benzthiazole | 2,6-bis-n-propylamino-4-phenylamino-pyrimidine | Orange. |
| 82 | 1-amino-4-nitrobenzene | 2,6-bis-ethylamino-4-(2'-cyano-phenylamino)-pyrimidine | Do. |
| 83 | do | 2,6-bis-isopropylamino-4-(2'-carbamyl-phenylamino)-pyrimidine | Do. |
| 84 | 1-amino-benzene-4-carboxylic acid-ethylester | 2,6-bis-methylamino-4-(2'-N-methyl-carbamid-phenylamino)-pyrimidine | Reddish-Yellow. |
| 85 | do | 2,6-bis-ethylamino-4-(2'-N-methyl-N-β-hydroxyethyl-carbamid-phenylamino)-pyrimidine | Do. |
| 86 | 1-amino-2-cyano-benzene | 2,6-bis-amino-4-(4'-carboethoxy-phenylamino)-pyrimidine | Yellow. |
| 87 | 1-amino-2-chloro-benzene | 2,6-bis-propylamino-4-(3'-methylsulphonyl-phenylamino)-pyrimidine | Do. |
| 88 | 1-amino-2,4-dichloro-benzene | 2,6-bis-methylamino-4-(3'-ethylsulphonyl-phenylamino)-pyrimidine | Do. |
| 89 | 1-amino-benzene-4-carboxylic acid-ethyl-ester | 2,6-bis-amino-4-(4'-sulphamyl-phenylamino)-pyrimidine | Do. |
| 90 | 1-amino-benzene-4-sulphonic acid-(4'-methylphenyl)-ester | 2,6-bis-methylamino-4-(4'-methyl-sulphamid-phenylamino)-pyrimidine | Reddish yellow. |
| 91 | 1-amino-4-nitrobenzene-2-carboxylic acid-isopropylester | 2,6-bis-amino-4-(4'-N-methyl-N-β-hydroxyethyl-sulphamid-phenylamino)-pyrimidine | Orange. |
| 92 | 1-amino-4-benzoylamino-benzene | 2,6-bis-ethylamino-4-(3'-acetylamino-phenylamino)-pyrimidine | Reddish yellow. |
| 93 | 1-amino-2,4-dinitro-benzene | 2,6-bis-amino-4-(3'-methyl-sulphonylamino-phenylamino)-pyrimidine | Orange. |
| 94 | 1-amino-2,4-dinitro-6-bromobenzene | 2,6-bis-methylamino-4-(3'-methylsulphonyloxy-phenylamino)-pyrimidine | Red. |

EXAMPLE 95

18.3 g. of 1-amino-2,4-dinitrobenzene are dissolved in 100 g. of concentrated sulphuric acid and the solution is diazotised at 20–25° with the amount of nitrosyl sulphuric acid corresponding to 6.9 g. of sodium nitrite. The diazonium salt solution so obtained is added dropwise at 0–5° to a solution of 27.1 g. of 4,6-bis-ethylamino-2-(4'-methyl-phenylamino)-pyrimidine in 300 g. of 80% acetic optionally in the presence of a carrier such as sodium-o-phenyl phenolate. The dyeings have very good fastness to washing, perspiration, rubbing, sublimation and light.

The 4,6-bis-ethylamino-2-(4'-methyl-phenylamino)-pyrimidine used in this example as coupling component is obtained, e.g. by reacting 4,6-dichloro-2-(4'-methyl-phenylamino)-pyrimidine with aqueous ethylamine at 150–160°.

Dyestuffs having similar properties are obtained if the diazo components given in column 2 of the following Table V are coupled under the conditions given in the above example with the coupling components given in column 3 of the same Table.

EXAMPLE 111

21.8 g. of 1-amino-2,4-dinitro-6-chlorobenzene are dissolved in 200 g. of concentrated sulphuric acid and the solution is diazotised at 20–30° with the amount of ni-

TABLE V

| | Diazo component | Coupling component | Shade on polyglycol-terephthalate fibres |
|---|---|---|---|
| Example No.: | | | |
| 96 | 1-amino-2-nitro-benzene | 4,6-bis-amino-2-phenyl-amino-pyrimidine | Yellowish-orange. |
| 97 | 1-amino-2-nitro-4-methylbenzene | do | Orange. |
| 98 | 1-amino-2-chloro-4-nitrobenzene | 4,6-bis-ethylamino-2-phenylamino-pyrimidine | Scarlet. |
| 99 | 1-amino-2-cyano-4-nitrobenzene | do | Do. |
| 100 | 1-amino-2-nitro-benzene-4-methylsulphone | 4,6-bis-methylamino-2-(2'-methyl-phenylamino)-pyrimidine | Do. |
| 101 | 1-amino-4-nitro-benzene-2-carboxylicaacid-methylamide | 4,6-bis-isopropylamino-2-(2'-chloro-phenylamino)-pyrimidine | Do. |
| 102 | 1-amino-2-nitro-benzene-4-carboxylioacid-N-methyl-N-β-hydroxy-ethylamide | do | Do. |
| 103 | 1-aminobenzene-4-carboxylic acid-phenylamide | 4,6-bis-amylamino-2-(3'-acetylamino-phenyl-amino-pyrimidine | Reddish-yellow. |

EXAMPLE 104

18 g. of 2-amino-6-methoxy-benzothiazole in 100 g. of concentrated sulphuric acid are diazotised at –5° with nitrosyl sulphuric acid, corresponding to 6.9 g. of sodium nitrite. This diazonium salt solution is added dropwise at 0–5° to a solution of 28.5 g. of 4,6-bis-propylamino-2-phenylamino-pyrimidine in 450 g. of 40% acetic acid. The pH of the coupling mixture is then raised to 4–4.5 by the addition of sodium acetate. On completion of the coupling, the precipitated red coupling product, the composition of which corresponds to the formula

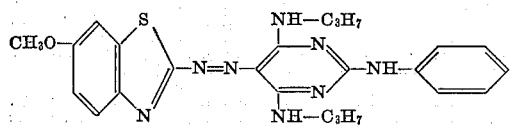

is filtered off, washed with water and then dried at 70–80° in vacuo. After milling with the sodium salt of the condensation product of naphthalene-2-sulphonic acid and formaldehyde, the dyestuff so obtained dyes polyglycol-terephthalate fibres from an aqueous dispersion, optionally in the presence of a carrier such as trichlorobenzene, in pure scarlet shades. The dyebath is substantially exhausted. The dyeings have very good fastness to washing, rubbing, light and sublimation.

Dyestuffs having similar properties are obtained if the diazo components given in column 2 of the following Table VI are coupled under the conditions described in the above example with the equivalent amounts of the coupling components given in column 3 of the same table.

trosyl sulphuric acid corresponding to 6.9 g. of sodium nitrite. The diazonium salt solution so obtained is added dropwise at 0–5° to a solution of a mixture consisting of 22.4 g. of 2,6-bis-ethylamino-4-phenylaminopyrimidine and 3.3 g. of 4,6-bis-ethylamino-2-phenylamino-pyrimidine in 400 g. of 80% acetic acid and 300 g. of water. On completion of the coupling, the precipitated dark red coupling product, the composition of which corresponds to the formulae

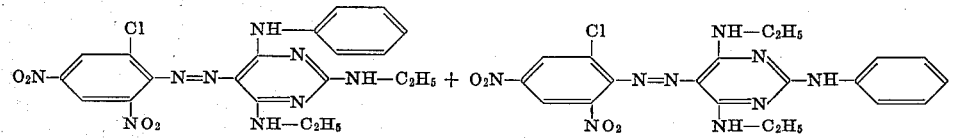

is filtered off, washed with water and dried in the usual way. 10 g. of the mixture of dyestuffs so obtained are brought into a finely dispersable form by milling with 20 g. of a lignin sulphonate.

Polyglycol terephthalate fibres and cellulose triacetate fibres can be dyed in pure red shades with this dye preparation from an aqueous bath, optionally in the presence of a carrier such the sodium salt of o-phenylphenol. The dyeings have very good fastness to washing, perspiration, rubbing, sublimation and light.

The mixture consisting of 4,6-bis-ethylamino-2-phenylamino-pyrimidine and 2,6-bis-ethylamino-4-phenylaminopyrimidine used in this example as coupling component is obtained, e.g. by condensation of 2,4,6-trichloro-pyrimidine with one equivalent of aniline and subsequent reaction of the condensation products with at least four equivalents of diethylamine at 150–155°.

Dyestuffs having similar properties are obtained when the equivalent amount of any one of the diazo components given in column 2 of the following Table VII is coupled with any of the mixtures of coupling components given in column 3 of the same table.

TABLE VI

| | Diazo component | Coupling component | Shade on polyglycol-terephthalate fibres |
|---|---|---|---|
| Example No.: | | | |
| 105 | 2-amino-5-nitro-thiazole | 4,6-bis-isopropylamino-2-phenylamino-pyrimidine | Red. |
| 106 | 3-amino-5-nitro-indazole | do | Orange. |
| 107 | 5-amino-1-phenyl-3-methyl-pyrazole | 4,6-bis-amino-2-(2'-methoxy-phenylamino)-pyrimidine | Yellow. |
| 108 | 4-amino-quinoline | do | Scarlet. |
| 109 | 4-amino-azobenzene | 4,6-bis-methylamino-2-(4'-chlorophenylamino)-pyrimidine | Do. |
| 110 | 4-amino-2',3-dimethyl-azobenzene | do | Do. |

TABLE VII

| | Diazo component | Coupling component | Shade on polyglycol-terephthalate fibres |
|---|---|---|---|
| Example No.: | | | |
| 112 | 1-amino-2,4-dinitro-benzene | 22.4 g. 2,6-bis-ethylamino-4-phenylaminopyrimidine; 3.3 g. 4,6-bis-ethylamino-2-phenylaminopyrimidine. | Red. |
| 113 | 1-amino-2-cyano-4-nitro-benzene | do | Scarlet. |
| 114 | 1-amino-2,6-dichloro-4-nitrobenzene | do | Do. |
| 115 | 1-amino-2-nitrobenzene | do | Orange. |
| 116 | 1-amino-4-nitrobenzene | do | Do. |
| 117 | 1-amino-4-nitrobenzene-2-carboxylic acid-ethylester. | do | Scarlet. |
| 118 | 1-amino-4-nitrobenzene-2-carboxylic acid-amide | do | Do. |
| 119 | 1-amino-4-nitrobenzene-2-carboxylic acid-methylamide. | do | Do. |
| 120 | 1-amino-4-nitrobenzene-2-carboxylic acid-dimethylamide. | do | Do. |
| 121 | 1-amino-4-nitrobenzene-2-carboxylic acid-$\beta$-hydroxyethylamide. | do | Do. |
| 122 | 1-amino-2-nitrobenzene-4-carboxylic acid-butylester. | do | Do. |
| 123 | 1-amino-2-nitrobenzene-4-carboxylic acid-N-methyl-N-phenylamide. | do | Do. |
| 124 | 1-amino-2-nitrobenzene-4-sulphonic acid-N-methyl-N-$\beta$-hydroxyethylamide. | 22.4 g. 2,6-bis-ethylamino-4-phenylaminopyrimidine; 3.3 g. 4,6-bis-ethylamino-2-phenylamino-pyrimidine. | Scarlet. |
| 125 | 1-amino-2-nitro-benzene-4-sulphonic acid-4'-methyl-phenylester. | do | Do. |
| 126 | 1-amino-2-nitro-4-methylsulphonyl-benzene | do | Do. |
| 127 | do | 17.5 g. 2,6-bis-amino-4-phenylamino-pyrimidine; 2.6 g. 4,6-bis-amino-2-phenylamino-pyrimidine. | Orange. |
| 128 | 1-amino-2-nitro-benzene-4-sulphonic acid-amide | 25 g. 2,6-bis-n-propyl-amino-4-phenylamino-pyrimidine; 3.5 g. 4,6-bis-n-propylamino-2-phenylamino-pyrimidine. | Scarlet. |
| 129 | 1-amino-2-nitro-benzene-4-sulphonic acid-methylamide. | 27 g. 2,6-bis-butylamino-4-phenylamino-pyrimidine; 4.1 g. 4,6-bis-butylamino-2-phenylamino-pyrimidine. | Do. |
| 130 | 1-amino-2-nitro-benzene-4-sulphonic acid-$\gamma$-methoxy-propyl-amide. | 30 g. 2,6-bis-isoamyl-amino-4-phenylamino-pyrimidine; 4.1 g. 4,6-bis-isoamyl-amino-2-phenylamino-pyrimidine. | Do. |
| 131 | 1-aminobenzene-4-carboxylic acid ethylester | 38 g. 2,6-bis-n-octyl-amino-4-phenylamino-pyrimidine; 4.5 g. 4,6-bis-n-octyl-amino-4-phenylamino-pyrimidine. | Reddish-yellow. |
| 132 | 1-aminobenzene-4-sulphonic acid-$\gamma$-methoxypropylamide. | 16.6 g. 2,6-bis-amino-4-(2'-methylphenylamino)-pyrimidine; 5 g. 4,6-bis-amino-2-(2'-methylphenylamino)-pyrimidine. | Reddish-yellow. |
| 133 | 1-aminobenzene-4-sulphonic acid-N-methyl-N-phenylamide. | 23 g. 2,6-bis-$\beta$-hydroxyethylamino-4-(2'-methylphenylamino)-pyrimidine; 7.3 g. 4,6-bis-$\beta$-hydroxyethylamino-2-(2'-methylphenylamino)-pyrimidine. | Do. |
| 134 | 1-amino-4-methyl-sulphonylaminobenzene | 27 g. 2,6-bis-$\gamma$-methoxypropylamino-4-(2'-methylphenylamino)-pyrimidine; 9 g. 4,6-bis-$\gamma$-methoxypropylamino-2-(2'-methylphenylamino)-pyrimidine. | Do. |
| 135 | 1-amino-4-(4'-methylphenyl)-sulphonylamino-benzene. | 26 g. 2,6-bis-$\beta$-chloroethyl-amino-4-(2'-methyl-phenylamino)-pyrimidine; 8.5 g. 4,6-bis-$\beta$-chloroethyl-amino-2-(2'-methyl-phenylamino)-pyrimidine. | Do. |
| 136 | 4-amino-azobenzene | 18.5 g. 2,6-bis-methylamino-4-(2'-methyl-phenylamino)-pyrimidine; 5.5 g. 4,6-bis-methylamino-2-(2'-methyl-phenylamino)-pyrimidine. | Scarlet. |
| 137 | 4-amino-3'-chloro-2-methyl-azobenzene | 17.6 g. 2,6-bis-amino-4-(3'-methyl-phenylamino)-pyrimidine; 3.9 g. 4,6-bis-amino-2-(3'-methyl-phenylamino)-pyrimidine. | Reddish-orange. |
| 138 | 4-amino-4'-nitro-azobenzene | 29 g. 2,6-bis-isoamylamino-4-(3'-methyl-phenylamino)-pyrimidine; 6.5 g. 4,6-bis-isoamylamino-2-(3'-methyl-phenylamino)-pyrimidine. | Scarlet. |
| 139 | 4-amino-2-methyl-5-methoxy-azobenzene | 25.5 g.2,6-bis-$\beta$-cyanoethylamino-4-(3'-methylphenylamino)-pyrimidine; 6.6 g. 4,6-bis-$\beta$-cyanoethylamino-2-(3'-methylphenylamino)-pyrimidine. | Do. |
| 140 | 2-amino-5-methyl-thiodiazole-(1,3,4) | 18 g. 2,6-bis-amino-4-(4'-methylphenylamino)-pyrimidine; 3.5 g. 4,6-bis-amino-2-(4'-methylphenylamino)-pyrimidine. | Orange. |
| 141 | 5-amino-1,3-di-methyl-pyrazole | do | Yellow. |
| 142 | 5-amino-1-phenyl-3-methyl-pyrazole | do | Do. |
| 143 | 4-amino-quinoline | 20.2 g. 2,6-bis-methylamino-4-(4'-methylphenylamino)-pyrimidine; 3.8 g. 4,6-bis-methylamino-2-(4'-methylphenylamino)-pyrimidine. | Scarlet. |
| 144 | 2-amino-3-nitro-5-acetyl-thiophene | do | Orange. |
| 145 | 3-amino-indazole | do | Reddish yellow. |
| 146 | 3-amino-5-nitro-indazole | do | Orange. |
| 147 | 3-amino-6-chloro-indazole | do | Reddish yellow. |
| 148 | 6-amino-indazole | do | Yellow. |
| 149 | 2-amino-1-methyl-triazole-(1,3,5) | 20.2 g. 2,6-bis-methylamino-4-(4'-methylphenylamino)-pyrimidine; 3.8 g. 4,6-bis-methylamino-2-(4'-methylphenylamino)-pyrimidine. | Yellow. |
| 150 | 2-amino-6-methoxy-benzthiazole | do | Scarlet. |
| 151 | 2-amino-5-nitro-thiazole | do | Red. |
| 152 | 1-amino-2-chloro-benzene | 15.2 g. 2,6-bis-amino-4-(4'-methoxy-phenyl-amino)-pyrimidine; 7.9 g. 4,6-bis-amino-2-(4'-methoxy-phenylamino)-pyrimidine. | Yellow. |
| 153 | 2-amino-naphthalene-5-sulphonic acid-methyl-amide. | do | Scarlet. |
| 154 | 1-amino-2,4-dinitro-6-chloro-benzene | 19 g. 2,6-bis-ethylamino-4-(4'-methoxy-phenylamino)-pyrimidine; 9.7 g. 4,6-bis-ethylamino-2-(4'-methoxy-phenylamino)-pyrimidine. | Bordeaux. |
| 155 | 1-amino-2,4-dinitro-benzene | do | Do. |
| 156 | 1-amino-2-nitro-benzene | 18 g. 2,6-bis-ethylamino-4-(4'-chlorophenylamino)-pyrimidine; 11.2 g. 4,6-bis-ethylamino-2-(4'-chlorophenylamino)-pyrimidine. | Orange. |
| 157 | 1-amino-2,4-dinitro-benzene | 20.2 g. 2,6-bis-methylamino-4-(4'-methylphenylamino)-pyrimidine; 3.8 g. 4,6-bis-methylamino-2-(4'-methylphenylamino)-pyrimidine. | Red. |
| 158 | 1-amino-2,4-dinitro-6-chloro-benzene | do | Do. |

EXAMPLE 159

Polyglycol terephthalate fabric (such as "Dacron" of E. I. du Pont de Nemours, Wilmington, Del., U.S.A.) is impregnated in a foulard at 40° with a liquor of the following composition:

20 parts by weight of the dyestuff according to Example 59, finely dispersed in
7.5 parts by weight of sodium alginate,
20 parts by weight of triethanolamine,
20 parts by weight of octylphenol polyglycol ether, and
900 parts by weight of water.

The fabric is wrung out to a liquor content of about 100% dried at 100° and the dyeing is then fixed for 30 seconds at a temperature of 210°. The dyed goods are rinsed with water, soaped and dried. Under these conditions, a scarlet dyeing is obtained which is fast to washing, rubbing, light and sublimation.

17

The dyestuffs described in the other examples produce dyeings of equal quality according to this process.

EXAMPLE 160

In a pressure dyeing apparatus, 2 g. of the dyestuff obtained according to Example 38 are finely suspended in 2000 g. of water containing 4 g. of oleyl polyglycol ether. The pH of the dyebath is adjusted to 5–5.5 with acetic acid.

100 g. of polyglycol terephthalate fabric are then introduced at 50°, the bath is heated to 140° within 30 minutes and dyeing is performed for 50 minutes at this temperature. The dyeing is then rinsed with water, soaped and dried. Under these conditions, a pure red dyeing is obtained which is fast to washing, perspiration, light and sublimation.

The dyestuffs described in the other examples produce dyeings of equal quality by this process.

EXAMPLE 161

2 g. of the dyestuff obtained according to Example 111 are dispersed in 4000 g. of water. 12 g. of sodium o-phenyl-phenolate are added to this dispersion as carrier and also 12 g. of diammonium phosphate are added and 100 g. of polyglycol terephthalate yarn are dyed for 1½ hours at 95–98°. The dyeing is rinsed and aftertreated with dilute sodium hydroxide solution and a dispersing agent.

In this way a pure red dyeing which is fast to washing, light and sublimation is obtained.

If in the above example, the 100 g. of polyglycol terephthalate yarn are replaced by 100 g. of cellulose triacetate fabric, dyeing is performed under the conditions given and the dyeing is then rinsed with water, a red dyeing is obtained which has very good fastness to washing and sublimation.

EXAMPLE 162

Polyglycol terephthalate fabric (such as "Dacron" of E. I. du Pont de Nemours, Wilmington, Del., U.S.A.) is impregnated in a foulard at 40° with a liquor of the following composition:

20 parts by weight of the dyestuff acording to Example 113, finely dispersed in
7.5 parts by weight of sodium alginate,
20 parts by weight of triethanolamine,
20 parts by weight of octylphenol polyglycol ether, and
900 parts by weight of water.

The fabric is wrung out to a liquor content of about 100%, dried at 100° and the dyeing is then fixed for 30 seconds at a temperature of 210°. The dyed goods are rinsed with water, soaped and dried. Under these conditions, a scarlet dyeing is obtained which is fast to washing, rubbing, light and sublimation.

We claim:

1. A composition of matter comprising
  (a) a fibrous material consisting essentially of fibers of linear high molecular ester of an aromatic polycarboxylic acid with a polyvalent alcohol, and
  (b) an azo dyestuff free from ionogenic groups which dissociate in water, of the formula

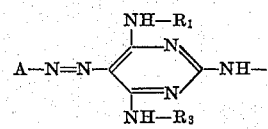

wherein

A represents carbocyclic or heterocyclic aryl,
one of $R_1$, $R_2$ and $R_3$ represents unsubstituted or nonionogenically substituted phenyl and

18 each of the latter three being unsubstituted or nonionocycloalkyl or phenalkyl,
each of the latter three being unsubstituted or nonionogenically substituted, 2. A composition of matter comprising
  (a) a fibrous material consisting essentially of fibers of cellulose triacetate, and
  (b) an azo dyestuff free from ionogenic groups which dissociate in water, of the formula

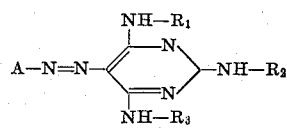

wherein

A represents carbocyclic or heterocyclic aryl,
one of $R_1$, $R_2$ and $R_3$ represents unsubstituted or nonionogenically substituted phenyl and
each of the other R's represents hydrogen or alkyl, cycloaklyl or phenalkyl,
each of the latter three being unsubstituted or non-ionogenically substituted.

3. A process for the coloring of organic material selected from a fibrous material consisting essentially of fibers of linear macromolecular esters of aromatic polycarboxylic acids with polyvalent alcohols, a fibrous material consisting essentially of fibers of cellulose acetate, a fibrous material consisting essentially of synthetic polyamide fibers, comprising dying the said fibers with an aqueous dispersion of an azo dyestuff free from ionogenic groups which dissociate in water, of the formula

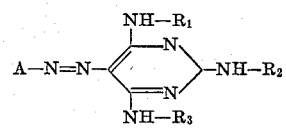

wherein

A represents carbocyclic or heterocyclic aryl,
one of $R_1$, $R_2$ and $R_3$ represents unsubstituted or nonionogenically substituted phenyl and
each of the other R's represents hydrogen or alkyl, cycloalkyl or phenalkyl,
each of the latter three being unsubstituted or nonionogenically substituted.

4. A process according to claim 3, wherein the fibrous material consists essentially of fibers of linear macromolecular ester of an aromatic polycarboxylic acid with a polyvalent alcohol.

5. A process according to claim 3 wherein the fibrous material consists essentially of the fibers of cellulose triacetate.

6. A process according to claim 3 wherein the fibrous material consists essentially of synthetic polyamide fibers.

References Cited

UNITED STATES PATENTS 3,042,648  7/1962  Lewis _____ 260—154
3,177,214  4/1965  Sulzer et al. _____ 260—154
3,341,512  9/1967  Wegmuller et al. _____ 8—26

NORMAN G. TORCHIN, Primary Examiner

J. E. CALLAGHAN, Assistant Examiner

U.S. Cl. X.R.

8—26, 50; 260—154

UNITED STATES PATENT OFFICE
CERTIFICATE OF CORRECTION

Patent No. 3,558,261     Dated January 26, 1971

Inventor(s) Hans Ackermann et al.

It is certified that error appears in the above-identified patent and that said Letters Patent are hereby corrected as shown below:

In the heading to the printed specification after line 6 insert -- assignors to J. R. Geigy AG, Basel, Switzerland after line 7, insert -- Claims priority, application Switzerland 10857/65 August 2, 1965 --.

Signed and sealed this 22nd day of August 1972.

(SEAL)
Attest:

EDWARD M. FLETCHER, JR.            ROBERT GOTTSCHALK
Attesting Officer                  Commissioner of Patent